UNITED STATES PATENT OFFICE.

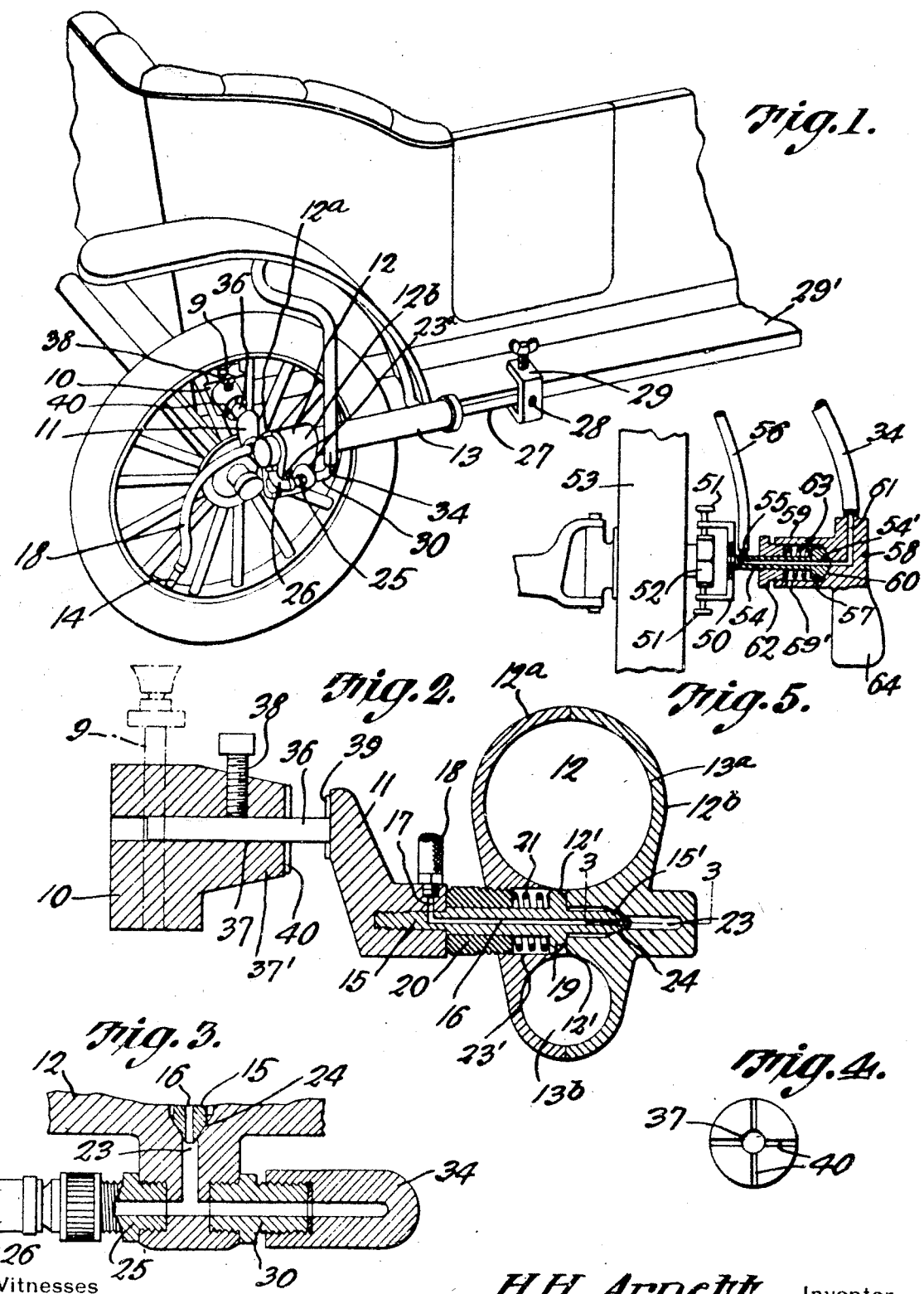

HOMER H. ARNETT, OF OSGOOD, OHIO.

PUMP ATTACHMENT.

1,241,696. Specification of Letters Patent. Patented Oct. 2, 1917.

Application filed October 19, 1916. Serial No. 126,589.

*To all whom it may concern:*

Be it known that I, HOMER H. ARNETT, a citizen of the United States, residing at Osgood, in the county of Darke and State of Ohio, have invented a new and useful Pump Attachment, of which the following is a specification.

The present invention appertains to pumps, and relates more particularly to pumps used upon automobiles or motor vehicles for inflating the pneumatic tires, it being the object of the invention to provide a novel and improved device for attaching a pump to an automobile.

Another object of the invention is to provide a pump mechanism for an automobile which is operable during the motion of the automobile for inflating the tires, whereby should one of the tires be punctured, air will be pumped into the tire to keep it inflated, so that the progress of the vehicle will not be impaired, the device being operable for inflating one or more of the tires.

A further object of the invention is the provision of a device as specified which enables the pump to be conveniently applied and effectively operated, the device accommodating pumps having different diameters of barrels or cylinders, and the device being adjustable to regulate the throw of the pump.

Another object of the invention is to provide a pump mechanism of the nature indicated wherein provision is made for the escape of the air to the atmosphere upon the occurrence of abnormal pressure, to prevent excessive pressure in the tires.

The invention also has for its object the provision of novel means for applying a pump to one of the propelling wheels of the automobile to be operated automatically thereby.

It is also within the scope of the invention to provide an appliance of the character specified which is comparatively simple and inexpensive in construction, as well as being practical, serviceable and efficient in use.

With the foregoing and other objects in view which will appear as the description proceeds, the invention resides in the combination and arrangement of parts and in the details of construction hereinafter described, it being understood that changes in the precise embodiment of the invention herein disclosed can be made within the scope of what is claimed without departing from the spirit of the invention.

The invention is illustrated in the accompanying drawings, wherein:—

Figure 1 is a perspective view of the device as applied.

Fig. 2 is an enlarged longitudinal section of the attachment.

Fig. 3 is an enlarged section on the line 3—3 of Fig. 2.

Fig. 4 is a detail view illustrating the face of the boss carried by the wheel engaging block.

Fig. 5 is a detailed view, partly in elevation and partly in section, illustrating the device for supplying air to the tire of the front wheel of the automobile.

The attachment embodies a wedge-shaped block or member 10 to engage wedgedly between a pair of spokes of one of the rear propelling wheels of the automobile, suitable means 9 being provided for holding the block in place. Thus, the means 9 may comprise a screw threadedly carried by the block 10 to bear against the felly of the wheel for forcing the block into place. The block 10 has an outstanding boss 37' and a horizontal bore 37 extending through the boss and adjustably receiving one terminal 36 of a crank 11. The terminal or shank 36 is adjustable longitudinally and rotatably within the block 10 for adjusting the position of the crank, a set screw 38 being carried by the boss 37' to hold the crank 11 in any adjusted position. The crank 11 and face of the boss 37' can be provided with interengaging ribs and grooves 39 and 40, whereby when the crank is moved against the boss 37', it will be positively held against angular movement relative to the block 10.

Carried by the crank 11 is a pump holder or clamp 12 comprising opposite side sections 12$^a$ and 12$^b$ secured together by screws 23$^a$ or other suitable securing means. The holder 12 has openings 13$^a$ and 13$^b$ parallel with one another for receiving different sizes of pump barrels or cylinders. The pump barrel or cylinder 13 is fitted within the proper opening of the holder and is clamped therein when the sections 12$^a$ and 12$^b$ are forced together.

The holder 12 is carried by an outstanding pintle 15 having one end threadedly or otherwise anchored within the free terminal of the crank 11, the free end of the pintle 15 being tapered to provide a valve 15'. The section 12$^b$ of the clamp 12 has a passage 23 receiving the free end of the pintle 15 and provided with a tapered or conical valve seat 24 against which the valve 15' is seatable to provide an air tight joint between the passage 23 and an axial passage 16 with which the pintle 15 is provided. The crank 11 has an outlet 17 communicating with the passage 16, and to which a hose or flexible tube 18 is connected to conduct the air from the passage 16 to the nipple or valve stem 14 of the pneumatic tire to which said hose or tube is connected. The section 12$^a$ of the holder has a recess 23' through which the pintle 15 extends axially thereof, and the pintle has a collar 19 within said recess. A sleeve 20 is threadedly or otherwise engaged within the mouth of the recess 23' and is fitted rotatably upon the pintle 15, a coiled wire expansion spring 21 being disposed within the recess 23' and confined between the collar 19 and sleeve 20, whereby to move the holder toward the crank 11 to hold the valve seat 24 against the valve 15'. The holder 12 has apertures 12' leading from the recess 23' to the openings 13$^a$ and 13$^b$, whereby when the pressure is abnormal, the holder 12 will be forced outwardly by the pressure, thereby removing the seat 24 from the valve 15', and permitting the air to escape around the pintle 15 and thence through one of the apertures 12' to the atmosphere. This will prevent excessive air pressure in the tire, but when the air pressure again reaches normal, the spring 21 will force the holder 12 inwardly to bring its seat 24 against the valve 15'. The holder 12 and crank 11 are thus assembled for relative rotary movements, and they are so connected as to provide a safety air pressure gage.

A hose or tube 26 connects the outlet of the pump barrel 13 with an inlet nipple 25 carried by the holder 12 and communicating with the passage 23, whereby the air will be forced by the pump into the passage 23.

The plunger rod 27 of the pump which works within the barrel 13, is pivoted, as at 28, to a clamp 29 which is applied to the running board 29' of the automobile, whereby as the rear wheel is rotated, the crank 11 will be carried around with the wheel, thereby moving the holder 12 likewise, and this will reciprocate the pump barrel 13 for forcing the air into the passage 23. It will be noted that the crank 11 can be adjusted inwardly and outwardly to accommodate the pump and the crank 11 can also be adjusted angularly, so that its offset terminal which carries the pintle 15 can be adjusted nearer to or farther from the hub, whereby to regulate the throw of the pump barrel.

In order to supply air to the front tire, a device as illustrated in Fig. 5 is employed, the same embodying a yoke 50 having clamped screws 51 to engage the hub 52 of the front wheel 53, and an outstanding pintle 54 having an axial bore or passage 54' is carried by the yoke, and has a nipple 55 adjacent to the yoke to which a hose or flexible tube 56 is connected, and said hose or tube can be connected to the nipple or valve stem of the front tire to supply air to said tire, the same as air is supplied to the rear tire by the hose or tube 18. The pintle 54 has a valve head 57 at its free end, and a member 58 is provided with a sleeve or recess 59 receiving the pintle 54 and providing a valve seat 60 against which the valve head 57 is seatable under the influence of a coiled wire expansion spring 63 confined between the valve head 57 and a sleeve 62 engaged within the end of the sleeve 59 and rotatable upon the pintle 54. The sleeve 59 has an air outlet 59', and the member 58 has a passage 61 registering with the passage 54' and to which a hose or flexible tubing 34 is connected. Said hose 34 extends along the running board 39' and is connected to a nipple 30 carried by the holder 12 in communication with the passage 23, whereby air not only flows from the hose or tube 26 into the passage 23 but also into the hose 34. From the hose 34, the air flows through the passage 61 into the passage 54' and thence by way of the hose or tube 56 into the front tire to inflate the same. The member 59 has a pendant weight 64 to hold said member in vertical position and to prevent it from rotating, while the pintle 54 is rotated with the front wheel. The connection between the pintle 54 and member 58 is somewhat similar to the connection between crank 11 and holder 12 above described, it being noted that in the event of excessive pressure, the member 58 is forced outwardly thereby permitting the air to escape from the passage 61 through the sleeve 59 and its outlet 59' to the atmosphere.

The present device is operable during the motion of an automobile, whereby air can be forced into the tires, should one or more of them be punctured, thereby keeping the tire or tires inflated so as not to impair the progress of the machine. It is thus possible to operate the automobile without inconvenience until the puncture can be remedied.

Having thus described the invention, what is claimed as new is:—

1. In a device of the character described, a member adapted to be carried by and rotated with a wheel, a pump holder assembled with said member to permit said member to rotate relative thereto, said holder having a passage to communicate with the pump, and said member having a passage registering with the aforesaid passage and adapted to be connected to a tire upon said wheel.

2. In a device of the character described, a member applicable to a wheel to rotate therewith, an angularly adjustable crank carried by said member, and a pump holder assembled with said crank to permit the crank to rotate relative thereto, said holder having a passage for receiving air from a pump, and the crank having means for conducting air from said passage to a tire upon said wheel.

3. In a device of the character described, a member applicable to and rotatable with a wheel, a crank having one terminal engaged adjustably with said member, an outstanding pintle carried by the other terminal of the crank and having an air conducting passage adapted to be connected with a tire on said wheel, a pump holder mounted upon said pintle and having a passage to receive air from a pump and communicating with the aforesaid passage, and spring means for holding the pintle and pump holder seated to provide a tight joint between said passages.

In testimony that I claim the foregoing as my own, I have hereto affixed my signature in the presence of two witnesses.

HOMER H. ARNETT.

Witnesses:
L. E. MILDENHAUS,
ANDY ALEXANDER.